(12) United States Patent
Kukulski et al.

(10) Patent No.: US 9,003,334 B2
(45) Date of Patent: Apr. 7, 2015

(54) EDITING CONTENT USING MULTIPLE TOUCH INPUTS

(75) Inventors: Tim Kukulski, Oakland, CA (US); Remon Tijssen, Mill Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1110 days.

(21) Appl. No.: 12/718,118

(22) Filed: Mar. 5, 2010

(65) Prior Publication Data

US 2013/0335333 A1 Dec. 19, 2013

(51) Int. Cl.
| | |
|---|---|
| G06F 3/033 | (2013.01) |
| G06F 3/041 | (2006.01) |
| G06F 3/048 | (2013.01) |
| G06F 3/01 | (2006.01) |

(52) U.S. Cl.
CPC . G06F 3/01 (2013.01); G06F 3/041 (2013.01)

(58) Field of Classification Search
CPC ............... G06F 3/0488; G06F 2203/04808; G06F 4/0488; G06F 4/0484; G06F 4/0481; G06F 4/017; G06F 4/04883
USPC ............. 715/863, 754; 345/173, 174, 157
See application file for complete search history.

(56) References Cited

U.S. PATENT DOCUMENTS

| | | | | |
|---|---|---|---|---|
| 2004/0164992 | A1* | 8/2004 | Gangnet et al. | 345/591 |
| 2006/0161870 | A1* | 7/2006 | Hotelling et al. | 715/863 |
| 2008/0180405 | A1* | 7/2008 | Han et al. | 345/173 |
| 2009/0051660 | A1* | 2/2009 | Feland et al. | 345/173 |
| 2009/0295746 | A1* | 12/2009 | Davidson | 345/173 |
| 2010/0283747 | A1* | 11/2010 | Kukulski | 345/173 |
| 2011/0074809 | A1* | 3/2011 | Chen et al. | 345/619 |
| 2011/0093821 | A1* | 4/2011 | Wigdor et al. | 715/863 |

OTHER PUBLICATIONS

Julie Meridian, "Adobe and the future of Multitouch," Sep. 18, 2009, adobe.com, pp. 1-2.*
Helen Bradley, "Working with Photoshop Shapes," Sep. 26, 2006, peachpit.com, pp. 1-3.*
"Using the Photoshop Type Tool," Sep. 26, 2006, adobetutorialz. com, pp. 1-4.*
WACOM, Cintiq 21UX Installation Guide & Hardware Manual, 2007.
WACOM, Cintiq Software User's Manual, 2007.
Adobe Systems Incorporated, Using Photoshop CS4, pp. i-vii and 332-389 (last updated Jan. 10, 2010) and available at http://help.adobe.com/en_US/Photoshop/11.0/photoshop_cs4_help.pdf (last accessed Feb. 18, 2010).
Ball, "Wacom Supports Adobe Creative Suite 4," Animation Magazine, 2008, available at http://www.animationmagazine.net/article/8957 (last accessed Feb. 18, 2010).
Kukulski et al., U.S. Appl. No. 12/684,300, filed Jan. 8, 2010.

* cited by examiner

*Primary Examiner* — Kieu Vu
*Assistant Examiner* — Asteway T Gattew
(74) *Attorney, Agent, or Firm* — Kilpatrick Townsend & Stockton LLP

(57) ABSTRACT

Multitouch capabilities can be used to allow a user to set adjust one or more application control parameters at the same time as editing commands are provided via touch input. The control parameters may relate to how/what edit commands are provided, such as allowing for varying brush characteristics, colors, gradients, and the like used in editing graphics or other document content. Additionally or alternatively, the control parameters may relate to a design canvas or other depiction of the document, such as allowing rotation, position, or magnification of the canvas while the document is edited.

19 Claims, 12 Drawing Sheets

EDITING CONTENT USING MULTIPLE TOUCH INPUTS

TECHNICAL FIELD

The disclosure below generally relates to systems and methods for using touch-based input in a computing system.

BACKGROUND

A computer user may have access to a laptop, desktop, tablet, or other computer that can receive touch-based input, such as via a touch-enabled display and/or via a peripheral device, such as a touch tablet. The touch may be made by a body part such as a finger and/or using a device, such as a stylus or pen. More recently, devices have become capable of detection of simultaneous touches.

A wide variety of applications can be used to edit documents. For example, applications such as Adobe® Photoshop®, Illustrator®, and the like (available from Adobe Systems Incorporated of San Jose, Calif.) can be used for editing raster, vector, and other graphics by providing various edit commands Other applications such as word processors, integrated development environments (IDEs), and the like can also be used to edit documents. Although applications may support touch-based input, some existing implementations simply substitute the touch-based input for another method (e.g., substituting pointing with a finger for pointing with a mouse or pen).

SUMMARY

Embodiments configured in accordance with one or more aspects of the present subject matter can leverage multitouch capabilities to enhance applications and can provide for a more natural workflow. For example, in some embodiments, multitouch capabilities can be used to allow a user to adjust one or more application control parameters while editing commands are provided via touch input. The control parameters may relate to how/what edit commands are provided, such as allowing for varying brush characteristics, colors, gradients, and the like used in editing graphics or other document content and/or selecting fonts and tools available for use in the editing application. Additionally or alternatively, the control parameters may relate to a design canvas or other depiction of the document, such as allowing rotation, position, or magnification of the canvas while the document is edited. The editing commands can comprise input specifying a location/extent of changes to be made to a document, such as a location in the document at which a graphic or other object is to be added, a path for a vector line, a set of coordinates to paint or select, a run of text or cursor position, etc.

In an embodiment, a system comprises a processor and a memory. The memory embodies one or more program components of an application that configures the computing system to present a graphical user interface depicting a document. The application can access data from one or more touch sensitive devices defining a touch area, the data representing at least a first and second touch input. Based on the accessed data, the system can determine locations of the first touch and second touch inputs using a mapping of locations on the touch sensitive device to coordinates in the touch area.

The system can determine if the first input has occurred at a first portion of the touch area and the second input has occurred in a second portion of the touch area different from the first portion and if the first and second inputs are to be treated as occurring at the same time. If so, the system can adjust an application control parameter based on the first touch input and edit the document based on the second touch input and the application control parameter as adjusted. As noted above, the application control parameter may define a tool characteristic, a canvas characteristic, and/or other value used by the application in editing the document in response to input and/or depicting the document in the interface.

One or more touches can be used at the same time for providing either or both of the edit input or for setting control parameters. For example, an embodiment of a computer-implemented method can comprise defining a graphical user interface configured to receive an edit command via one or more touch inputs and to edit a document in response. The method can further comprise accessing data from at least one touch sensitive device, the data representing at least three simultaneous touches within a touch area defined by the touch sensitive device. In response to a first touch input comprising a first plurality of touches, the application control parameter can be adjusted, while in response to at least one second touch input (comprising a touch separate from the first plurality of simultaneous touches) the document can be edited.

These illustrative embodiments are discussed not to limit the present subject matter, but to provide a brief introduction. Additional examples of embodiments of systems, methods, and computer-readable media configured in accordance with the present subject matter are described below in the Detailed Description. Objects and advantages of the present subject matter can be determined upon review of the specification and/or practice of an embodiment in accordance with one or more aspects taught herein.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Figure 1:
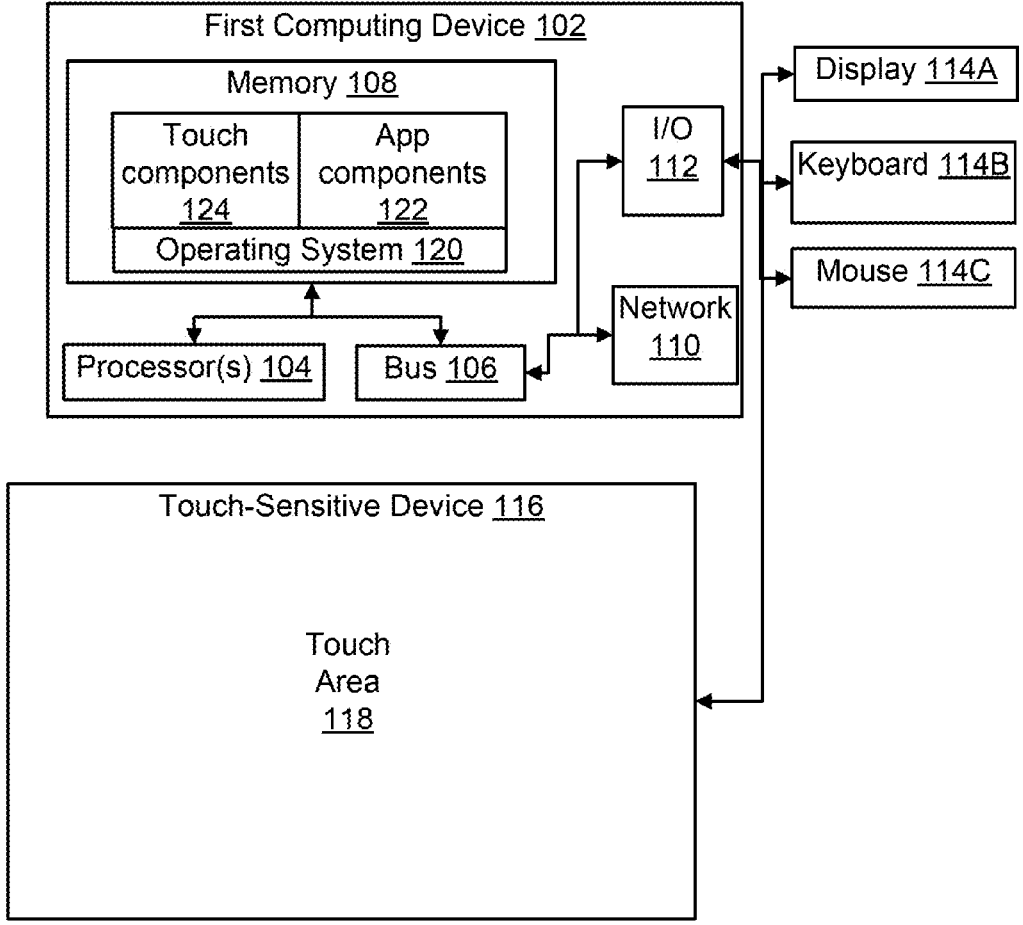
FIG. 1 is a diagram showing an exemplary computing system configured to support simultaneous control and input using multitouch.

FIG. 1 is a diagram showing an exemplary computing system 100 configured to support simultaneous control and input using multitouch. In this example, system 100 includes a first computing device 102 that comprises one or more processors 104, a tangible, non-transitory computer-readable medium (memory 108), a networking component 110, and several I/O components 114 linked to processor 104 via I/O interface(s) 112 and bus 106.

For example, memory 108 may comprise RAM, ROM, or other memory accessible by processor 104. I/O interface 112 can comprise a graphics interface (e.g., VGA, HDMI) to which display 114A is connected, along with a USB or other interface to which keyboard 114B and mouse 114C are connected. Display 114A can use any technology, including, but not limited to, LCD, LED, CRT, and the like. Networking component 110 may comprise an interface for communicating via wired or wireless communication, such as via Ethernet, IEEE 802.11 (Wi-Fi), 802.16 (Wi-Max), Bluetooth, infrared, and the like. As another example, networking component 110 may allow for communication over communication networks, such as CDMA, GSM, UMTS, or other cellular communication networks.

Computing device 102 is interfaced to one or more touch-sensitive devices 116 defining a touch area 118. Embodiments of the present subject matter can use any suitable technology or combination of technologies to determine the location and nature of touch inputs and to recognize touch inputs from those inputs. For instance, touch-sensitive device 116 may include one or more optical, capacitive, resistive, and/or other sensors that provide data that computing device 102 can use to determine the location of touches in the touch area 118. In some embodiments, touch area 118 corresponds to some or all of the area of display 114A. However, touch area 118 can correspond to another surface, such as an input surface included in a trackpad or other device.

Computing device 102 is configured by program components embodied in the memory to present a graphical user interface using the display, the graphical user interface depicting one or more documents to be edited. In this particular example, memory 108 embodies an operating system 120 in which an editing application that includes functional components 122 and touch components 124 is running. Components 122 and 124 are meant to illustrate any type of editing application suitably configured in accordance with the present subject matter to support use of multiple touch inputs for simultaneous control and editing input.

Any document of any type can be depicted and edited in the graphical user interface. Examples include, but are not limited to, word processing documents, graphical documents, video documents, computer applications, and web pages. "Editing" can comprise adding, removing, and/or changing any of text, graphics, or any other document content.

The program components can configure the computing system to access data from touch sensitive device(s) 116, the data representing at least a first touch input and a second touch input. Based on the locations of the first touch input and the second touch input and using a mapping of locations on the touch sensitive device to coordinates in the touch area, touch components 124 can determine if the first touch input has occurred at a first portion of the touch area and at least the second touch input occurs in a second portion of the touch area different from the first portion.

In response to determining that (i) the first touch input occurs at a first portion of the touch area and the second touch input occurs in a second portion of the touch area and (ii) the first and second touch inputs are to be treated as occurring at the same time, the editing application can adjust an application control parameter based on the first touch input while editing the document based on the second touch input and the application control parameter as adjusted. The first and second inputs can be treated as occurring at the same time if they are, in fact occurring simultaneously, but also if one of the inputs was previously recorded and a user has directed the application to play back the previously-recorded input.

As used herein, an "application control parameter" is meant to include any data that can be adjusted by a user of the editing application in order to influence how the application displays and/or edits the document in response to input. Examples of application control parameters include, but are not limited to tool selection, tool parameters used in editing, such as brush selections, sizes, and other parameters in a graphics editing application. As another example, other visual parameters, such as one or more colors, patterns, gradient values, and other characteristics to be used in editing a graphic element. Still further parameters such as the source area for use by a clone tool, can be selected. As another example, vector graphic parameters, such as point/handle parameters for a curve, can be set. Additional examples include font selection, font size and other characteristics (e.g., italics, underline, etc) and selection of objects (vector or otherwise) to be added in a document. As yet another example, an editing application may support 3-D or other modeling in which a plurality of components can be selected and manipulated. An application control parameter can comprise selection of a particular component type, subassembly, or the like.

Still further, control of other aspects of the application can be defined by application control parameters. For example, parameters such as the size, shape, position, magnification, or rotation of a canvas displaying the document being edited can be adjusted. In a video, audio, or other application with linear or time-related editing, an application control parameter can include a timeline position and scale displayed/viewed (e.g., a view of 3-5 seconds of video versus 3-5 minutes of video).

In the example of FIG. 1, a single touch-sensitive device 116 is shown. However, embodiments include those in which the touch area is defined by a plurality of touch sensitive devices interfaced to the processor. For example, in some embodiments, one or more second computing devices can be interfaced to first computing device 102, such as by using a runtime environment or otherwise configured as set forth in U.S. patent application Ser. No. 12/684,300, titled, "METHODS AND SYSTEMS FOR USING A MOBILE DEVICE FOR APPLICATION INPUT" and filed Jan. 8, 2010, which is incorporated by reference herein in its entirety. Additionally, although this example depicts an editing application running within an operating system, in some embodiments the editing application operates as a component within a runtime environment, such as Adobe® Flash® or Air®, available from Adobe Systems Incorporated of San Jose, Calif.

Figure 2:
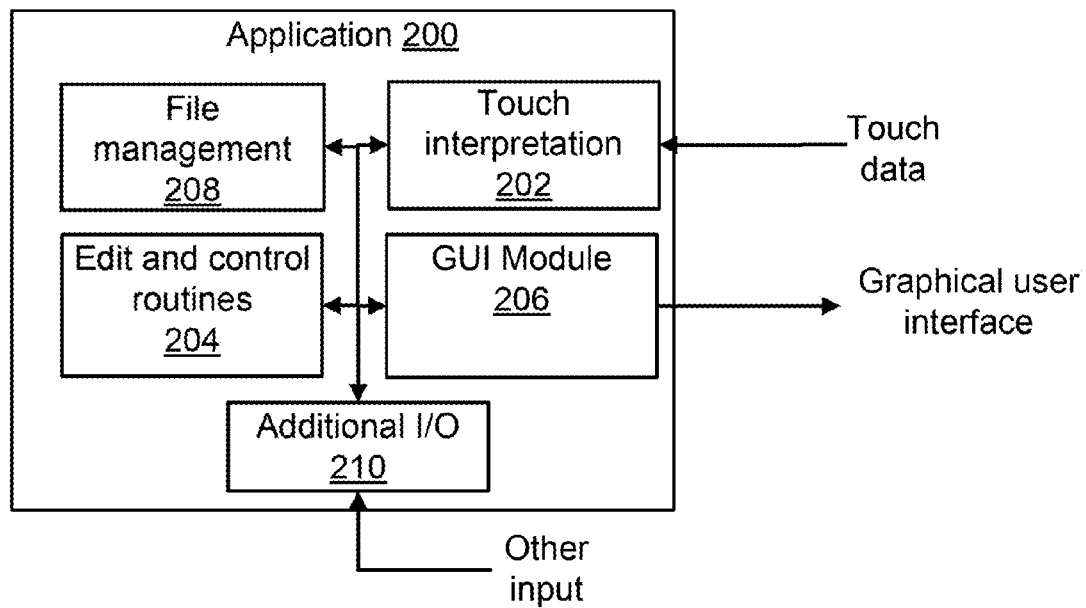
FIG. 2 is a block diagram of an exemplary architecture for an application configured to support simultaneous control and input using multitouch.

FIG. 2 is a block diagram of an exemplary architecture of an application 200 configured to support simultaneous control and input using multitouch. This example is not meant to exhaustively detail the functionality of an application or runtime environment that should be known to one of skill in the art, but instead provides examples of components that can be used to implement embodiments of the present subject matter.

Application 200 includes a touch interpretation module 202 that receives touch data in order to recognize inputs. For example, data from the touch-sensitive device may be sampled and analyzed to determine touch locations within a coordinate system. As another example, the touch locations may be provided as coordinates directly from the touch-sensitive device and/or a device driver. If multiple devices are used together, touch interpretation module 202 can rely on a coordinate system that extends to all of the devices to uniquely identify various touch locations in a coherent manner.

Touch interpretation module 202 can recognize touch inputs by tracking touch characteristics over time. As will be noted below, in some embodiments touch interpretation module 202 can determine which touch input(s) of multiple simultaneous inputs are intended to adjust application control parameters and which inputs are intended for edit input based on the location of the relative locations of the touch inputs For example, a first portion of the graphical user interface can be mapped to a first portion of the touch area and a second portion of the graphical user interface can be mapped to a second portion of the touch area. Touch inputs occurring in the first portion can be treated as inputs to adjust a control parameter, while touch inputs in the second portion can be treated as inputs to invoke edit commands. In some embodiments, the first portion of the graphical user interface can depict control elements, while the second portion can depict an editing area (e.g., a canvas depicting the document). As an example, the edit command may result in drawing in the canvas—touches occurring in the first portion can be treated as inputs to adjust a control parameter, while touches in the second portion can be treated as if a physical tool (or finger) were making marks upon the canvas.

Edit and control routines 204 are shown to generally illustrate programming of application 200 that controls various states of the application and provide the capabilities to view and edit documents in response to input. For example, routines 204 can include logic to play back and control content of a video, select a portion of a document for display in a window and create scrolling effects, render raster and/or vector graphics in response to stroke data, and provide corresponding editing capabilities. As non-limiting examples, routines 204 may allow for a "paint" tool that adds a specified pattern of color in response to data identifying a location, desired color information, and the like. As another example, routines may provide for "shape" tool that adds a vector graphic element based on information defining location, size, etc.

Edit and control routines 204 may represent any capabilities of editing applications including, but not limited to, Adobe® Photoshop®, Illustrator®, Flash Builder®, Dreamweaver®, Premiere Pro®, Fireworks®, and the like (all available from Adobe Systems Incorporated of San Jose, Calif.) as well as applications such as word processors, spreadsheets, database management applications, slideshow and other presentation applications, and any other application types that can be used to edit content in a graphical user interface.

Touch interpretation module 202 can determine which touch inputs are intended to create edit commands (e.g., draw a line, move an object, define a shape, add/select text, etc.) and which inputs are intended to specify changes in application control parameters (e.g., color to use in drawing a line, tool selection/characteristics, canvas size, etc.). As the touch inputs occur, touch interpretation module 202 can pass appropriate commands to invoke edit commands of edit and control routines module 204 and can change application control parameters accordingly to allow for simultaneous editing of a document while the control parameter(s) are adjusted. Exemplary embodiments are noted later below.

In some embodiments, the first and second touch inputs occur at the same time. However, embodiments include those in which the editing application supports playback of previously-recorded inputs. For instance, the application may include a routine to record inputs input in the touch area over time and to play back the recorded input(s). Touch interpretation module 202 can then play back the recorded input while receiving "live" input. Thus, at least one of the "simultaneous" inputs may be represented by a playback of previously-recorded input.

Graphical user interface module 206 is operative to define a graphical user interface comprising various elements such as buttons, sliders, input fields, and objects that display video, still images, and/or other content of one or more documents being edited using edit and control routines 204. File management 208 represents components that handle reading and storing files from memory, accessing data from remote servers, and otherwise moving data into and out of application 200. Additional I/O module 210 represents software used to receive other input, such as keyboard, mouse, speech, and other input.

Embodiments can operate directly from touch inputs represented by data, such as a series of coordinates describing one or more touch sequences. If the coordinates lie in a control area, the touch input can be interpreted as adjusting an application control parameter, such as using a mapping of coordinates in the control area to particular parameter values and/or a mapping of control elements (e.g., sliders, buttons, dials, etc.) to coordinate locations, with the control element(s) manipulated by the touch input. If the coordinates lie in a canvas, the series of coordinates can be passed as stroke data or other data to indicate movement, selection, or other edit commands in the canvas. As another example, in some embodiments, the touch input is recognized via one or more routines (e.g., gesture recognizers) that identify touch gestures, with a particular command passed to the edit and control routines based on which gesture is recognized and where the gesture occurs.

Embodiments may be implemented as a standalone application or in a web service. For example, a web service embodiment may provide file management and edit/control routines via server-side modules that interact with a client-side module or control. The client-side module or control can receive touch input data and relay data to the server-side modules and render a graphical user interface based on data received from the server-side modules. For example, a client-side graphics editing application may be implemented using Adobe® Flash® or Air® to pass stroke data and control data received from a touch pad or touch display and render graphics generated by server-side components that maintain and edit raster and/or vector graphic representations.

Figure 3:
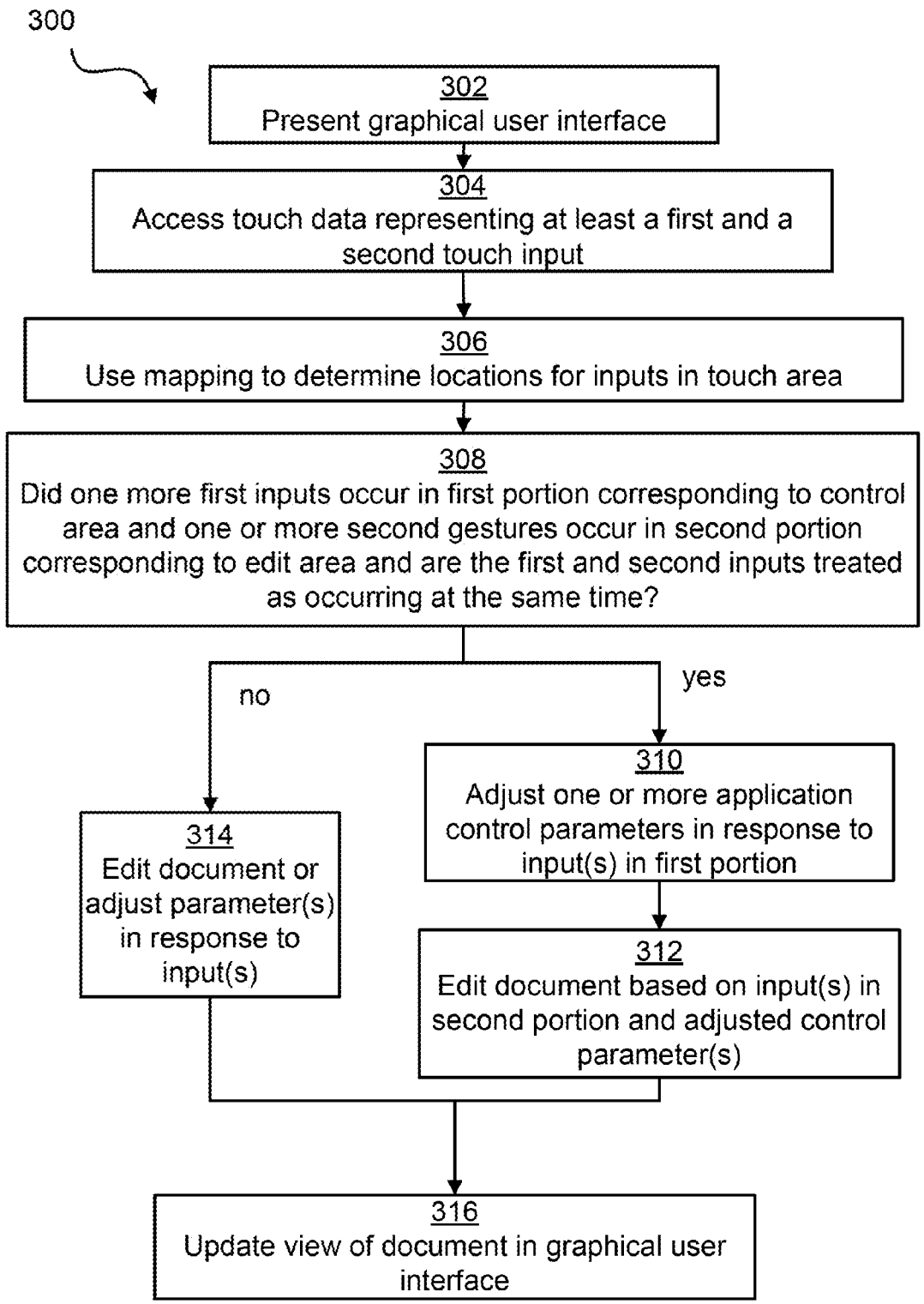
FIG. 3 is a flowchart showing an illustrative method of simultaneous control and input using multitouch.

FIG. 3 is a flowchart showing an illustrative method 300 of simultaneous control and input using multitouch. Block 302 represents presenting a graphical user interface, such as by generating signals for providing a view of a document to be edited, the view rendered by one or more displays. Block 304 represents accessing data from one or more touch sensitive devices, the data representing at least a first touch input and a second touch input.

As used herein, a touch input is meant to include any recognizable pattern of tactile input. This may include a single touch by a finger or other object to a screen without movement (i.e., a traditional touch) or a touch accompanied by any detectable motion. For instance, a touch input may be represented by a single coordinate if the touch is in one place, or by a series of coordinates over time if motion occurs. Additionally, a touch input can comprise a single touch or multiple simultaneous touches. As noted above, a touch input may be recognized in terms of what are referred to in some contexts as "touch gestures," but it should be understood that explicit recognition of "gestures" is not necessary; rather, touch location data can be used directly in some embodiments by an application to set application control parameter values and/or for editing input.

Block 306 represents using the accessed data to determine locations of the first touch input and the second touch input using a mapping of locations on the touch sensitive device to coordinates in the touch area. For example, in some embodiments, the touch area is mapped to coordinates in the graphical user interface, a portion of which is devoted to a canvas for displaying and editing a document. One or more other portions can be devoted to receiving control inputs. In an embodiment supporting playback of a previously-recorded input, block 306 can comprise accessing a stream of data representing at least one previously-recorded input. The stream of data may comprise a time series of coordinates, for example.

Block 308 represents determining if (i) the first touch input occurs at a first portion of the touch area and at least another touch input occurs in a second portion of the touch area different from the first portion and (ii) if the inputs are to be treated as occurring at the same time. As noted above, embodiments can, of course, treat inputs as occurring at the same time if they occur simultaneously (or within an accepted sampling interval for the system). However, some embodiments may support recording playback of inputs as noted above; thus, if playback is enabled, the played-back input may be treated as occurring at the same time as one or more "live" inputs. In this example method 300 determines if the first input occurs in a control area while the second input occurs in an edit area. However, additional embodiments may include multiple different areas responsive to inputs, with different areas allowing for different types of edit commands and/or setting different control parameters.

In response to determining that the first touch input occurs at a first portion of the touch area while at least the second touch input occurs in a second portion of the touch area, one or more application control parameters can be adjusted. Block 310 represents adjusting one the application control parameter(s) based on the first touch input while block 312 represents editing the document based on the second touch input and the application control parameter as adjusted. In practice, algorithms can be designed for blocks 310 and 312 to be carried out effectively in parallel.

As discussed above, an application control parameter can include any value or command used to influence how an application displays a document or responds to edit commands. In response to the input, suitable values can be passed to the control and logic for the application so that the corresponding edit command or application function acts appropriately. For example, if the first touch input is intended to change application control parameters related to color, transparency, and the like, then RGB and other values can be updated as the touch input occurs. As the second touch input occurs, suitable edit commands can be invoked. For example, a single-finger drag in a design canvas may provide a stroke path to invoke a "paint" command which accesses the color, transparency, and other application control parameters to determine the characteristics of a color or pattern applied to the design canvas along a set of coordinates specified by the stroke path. As a further example, the first input may relate to another application control parameter, such as a view of a document. The "paint" command can be invoked while the control parameter is changed so that the document is magnified, reduced, translated, and/or rotated.

Either or both the first and second touch inputs may comprise multiple touches. For instance, the first touch input may include multiple touch points, each touch point used to vary a different control value (e.g., an RGB value) as the first touch input occurs. The second touch input may include multiple touch points, each touch point invoking the same edit command or a different edit command (e.g., one touch invokes a "paint" command while the other invokes a "line" command). As another example, the first touch input may include two touch points, each of which selects an application control value comprising a source point for use by a clone tool. The second touch input may include two touch points, each of which invokes a clone command to paint based on the content of a respective one of the two source points.

Block 316 represents updating the view of the document in the graphical user interface. Though not shown in FIG. 3, the method can return to block 304 to continually look for additional touch data and interpret the data accordingly. In practice, the application may continually access the data representing the first touch input, update the application control value(s) as appropriate, and respond to the edit command(s) specified by the second touch input in rapid succession.

In some embodiments, an application may provide an interim update based on the edit input and application control parameter(s) to allow for faster rendering of the edit(s) to the document and then perform a full rendering using another process. For instance, if gradient settings are changed using a first touch input provided simultaneously with a second touch input providing a path for the gradient in the document, the interim rendering may not include the gradient as ultimately rendered, but may instead include a rasterized version or placeholder, with the true gradient rendered later. To do so, the method can store data associating the application control parameter(s) with locations of corresponding edit commands. The stored data can then be used in generating the full rendering. This can allow the application to provide a rendering of the document that closely follows the touch position(s) in the second touch input even if the edits to the document require enough processing so that rendering the changes would otherwise be delayed.

Returning to block 308, a second branch includes block 314, which is reached if the first touch input and second touch input do not occur at corresponding portions (or if only a control or editing input is provided). Block 314 represents carrying out one or the other of editing the document or adjusting application control parameters, and is included to illustrate how an application can, of course, provide for input other than simultaneous control of application parameters and editing input.

As noted above, the first touch input may be made at the same time as the second touch input, or may be a representation of a previously-sampled touch input. For instance, in some embodiments, the first touch input can be sampled over a time interval. In particular, in response to a start command, the application can track the first touch input, such as tracking the position of a touch point in a control area over time. The sampled touch input can then be replayed on a looping or non-looping basis and treated as "live" by the application while the second touch input is provided.

As a particular example, the control area may comprise a color selection palette. A user may trigger a sampling routine of the editing application and trace a pattern through the color selection palette (e.g., red-green-blue-green-white-yellow). The sample can be played back while the user provides edit commands via one or more touch inputs in the edit area. For instance, the user can paint one or more lines, with the line colors changing as the sample is replayed. While the sample is replayed, the user could provide still further touch inputs (e.g., adjusting transparency, brush size, etc.) so that application control parameters are adjusted based on both the sample and the live input.

Figure 4:
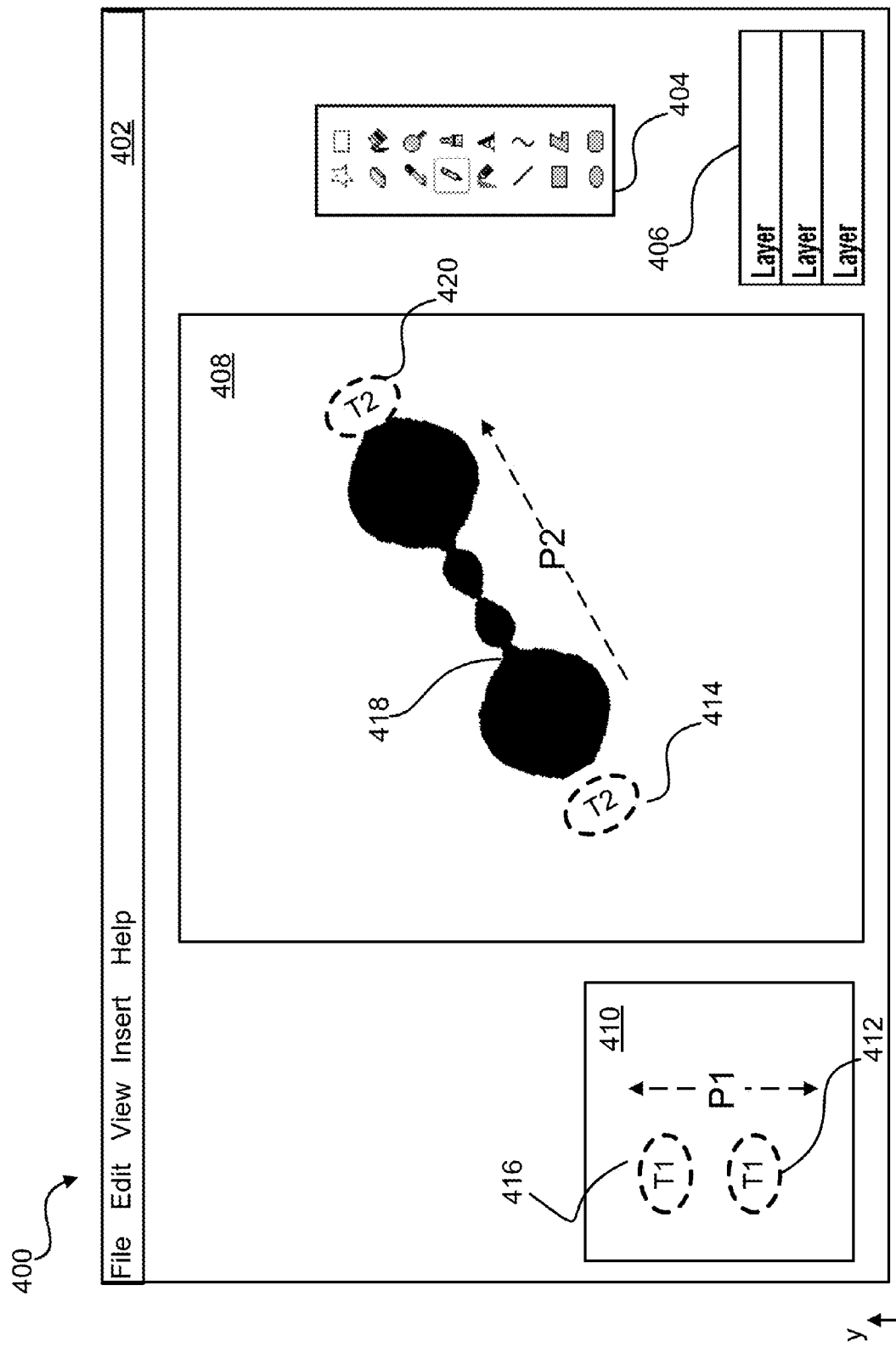
FIG. 4 is a diagram showing an illustrative use of multitouch for simultaneous editing and adjustment of application control parameters related to brush characteristics.

FIG. 4 is a diagram showing an illustrative use of multi-touch for simultaneous editing and adjustment of application control parameters related to brush characteristics. This example shows an illustrative graphical user interface 400 of an editing application, such as a graphics editing application. Interface 400 features menu bar 402, tool selector 404, and layer selector 406. Other toolbars, panels, and the like may of course be used. This example also features a canvas 408 depicting a document being edited and a control area 410. Canvas 408 can be mapped to a first portion of a touch area while control area 410 is mapped to a second portion of the touch area.

For instance, if interface 400 is presented using a touch-enabled screen, then canvas 408 may correspond to a first range of x-y coordinates while control area corresponds to a second range of x-y coordinates. Other elements of interface 400 may have their own requirements and may be invoked via touch inputs (e.g., a touch in an appropriate area of tool selector 404 can change tools, etc.).

In this example, control area 410 is used to adjust one or more application control parameters including brush size. The first touch input comprises a single touch point T1 that begins at position 412. As shown at 414, the second touch input also comprises a single touch point T2. The first touch input comprises movement of T1 from position 412 up and down (y+ and y−) in control area 410, with the finger or other object moving between positions 412 and 416 as shown by P1. At the same time as the first touch input is considered, T2 is moved towards position 420. As shown at 418, this results in a "bowtie" pattern as point T2 follows path P2, with the brush size increased and decreased as the second touch input invokes the paint command at various coordinates.

In the examples of FIGS. 4-9, the control area is shown in the graphical user interface alongside a canvas and the document being edited. It will be understood that the corresponding touch area for the control area and canvas be provided using separate devices, and the corresponding portions of the graphical user interface could be displayed on separate device. For example, in one embodiment, a runtime environment is used on a touch-enabled mobile device to depict control area 410 and receive the first touch input. A second device (e.g., desktop computer) can be interfaced to the mobile device to receive data regarding the first touch data while using its own display and touch capabilities to render canvas 408 and receive the second touch input. Additionally, whether a touch area is defined using a single device or multiple devices, multiple control areas or canvases may be included in the graphical user interface.

Figure 5:
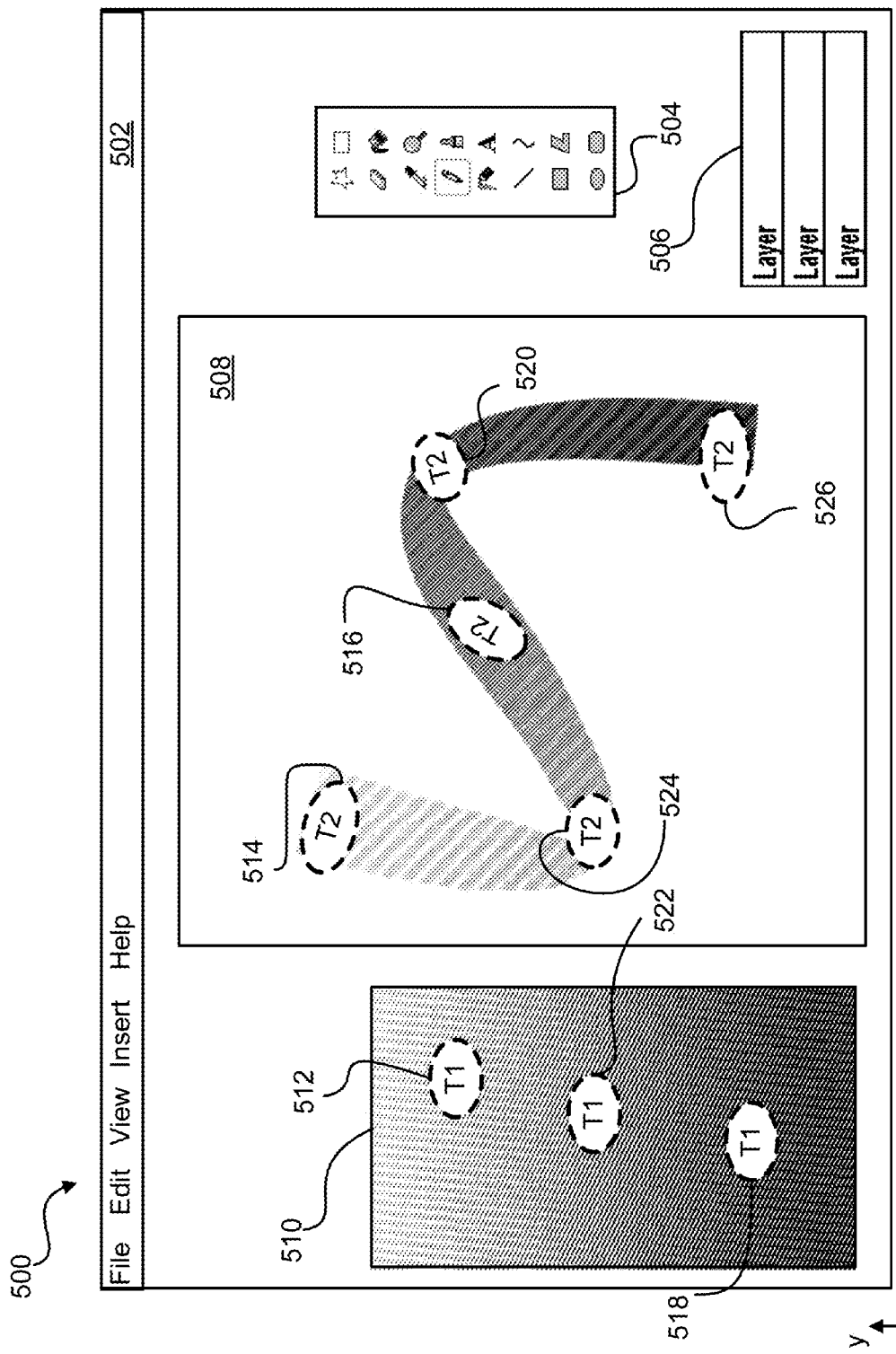
FIG. 5 is a diagram showing an illustrative use of multitouch for simultaneous editing and adjustment of application control parameters related to color.

FIG. 5 is a diagram showing an illustrative use of multi-touch for simultaneous editing and adjustment of application control parameters related to color. A graphical user interface 500 is shown and features menu bar 502, tool selector 504, and layer selector 506. In this example, design canvas 508 depicts a graphic to be edited and control area 510 is used to adjust application control parameters relating to color. In this example, as indicated by the different cross-hatching, different colors are associated with different portions of control area 510.

Although not shown here for ease of explanation, any mapping of color (or other) characteristics to coordinate values could be used. For example, a full color model with blends between different values could be depicted in the control area. As another example, a first portion of the control area could be used to select a hue while the remainder of the area allows for selection of different saturation levels in a rectangle or other shape. Additionally or alternatively, slider or other control elements could be used (e.g., RGB sliders, CMYB sliders, etc.).

This example shows a first touch input featuring a single touch point T1 that begins at position 512. The second touch input features a single finger T2 and begins at 514 to ultimately produce a shape ending at 526. As point T2 moves to position 516, a first color is painted. As point T2 reaches position 516, point T1 is moved to point 518. Accordingly, as shown by the denser cross-hatching, as point T2 moves towards point 520, a different color is painted. This example also shows a difference in the width of the graphic painted in the design canvas, for example, the pressure or orientation for the finger making the touch input may be varied. Point T2 is moved to position 522, resulting in another change as point T2 moves from 520 to 524.

Although not shown here, the application can track the changes with a high degree of precision. For instance as point T1 transitions between colors, the corresponding color painted using point T2 can reflect the transition. As another example, a more abrupt change can be achieved by specifying a mapping of x-y coordinates in control area 510 that includes abrupt changes between color values.

Figure 6A:
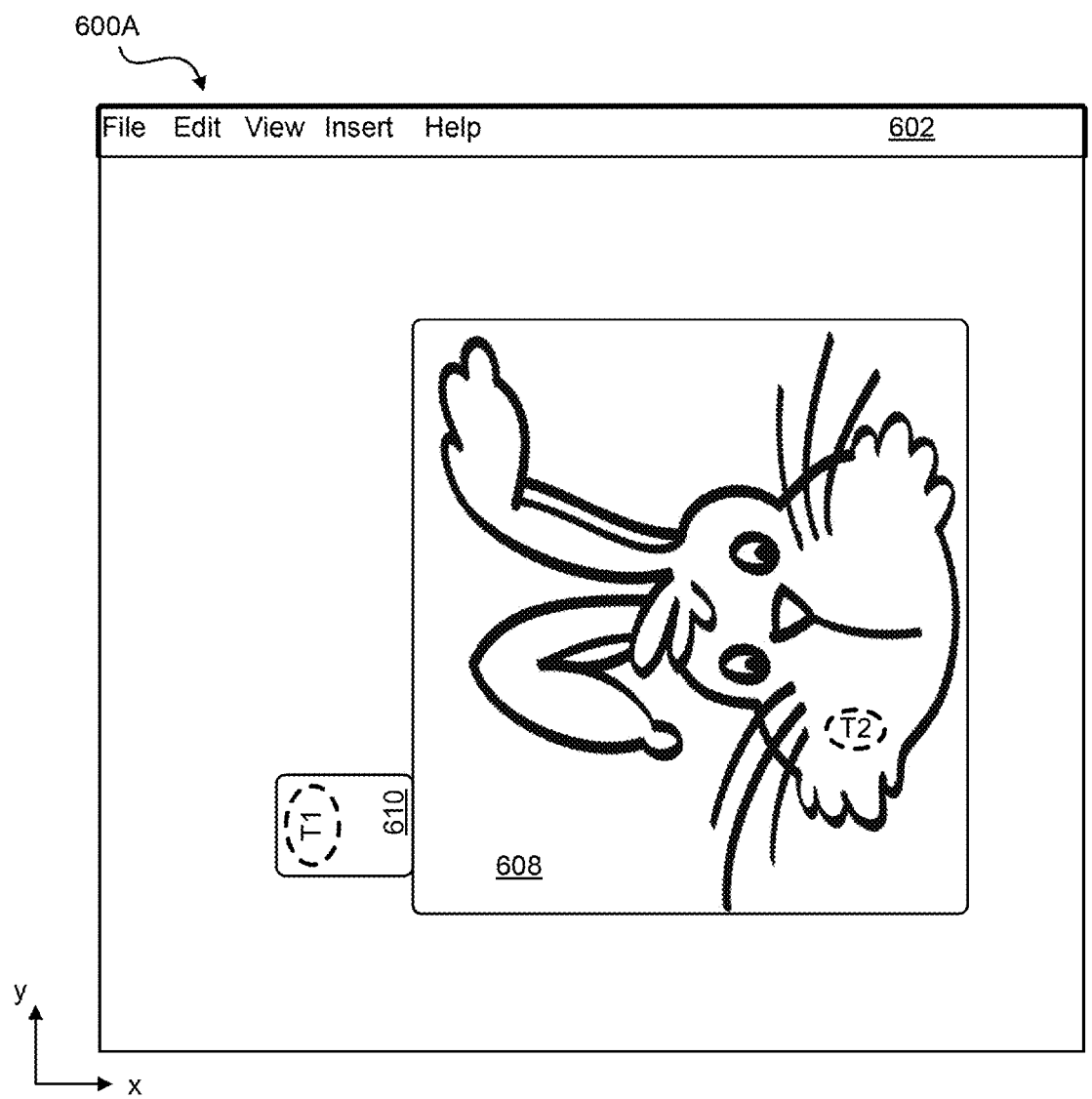
FIGS. 6A-6C are each a diagram showing an illustrative use of multitouch for simultaneous editing and adjustment of application control parameters related to rendering of a document in a graphical user interface.
Figure 6B:
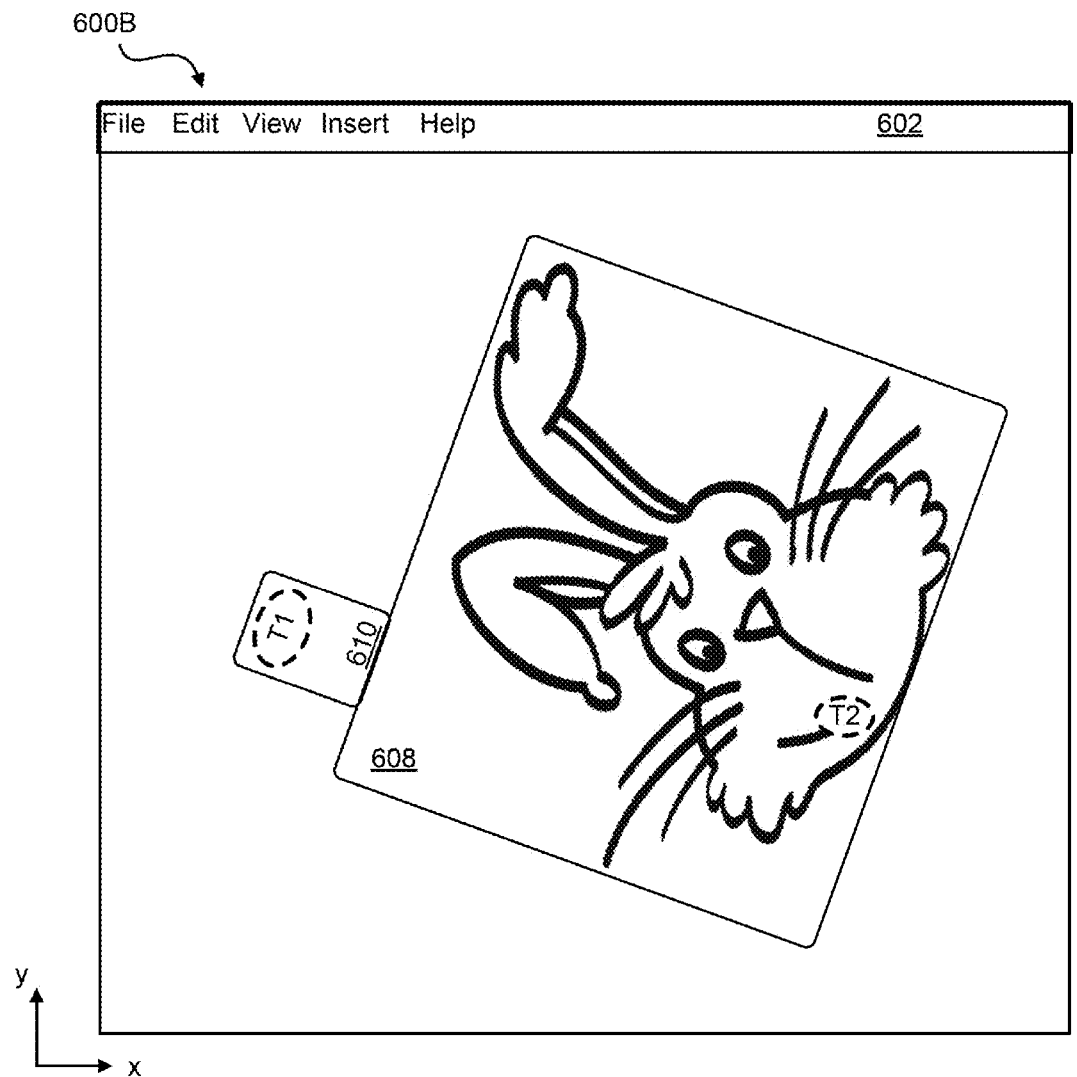
Figure 6C:
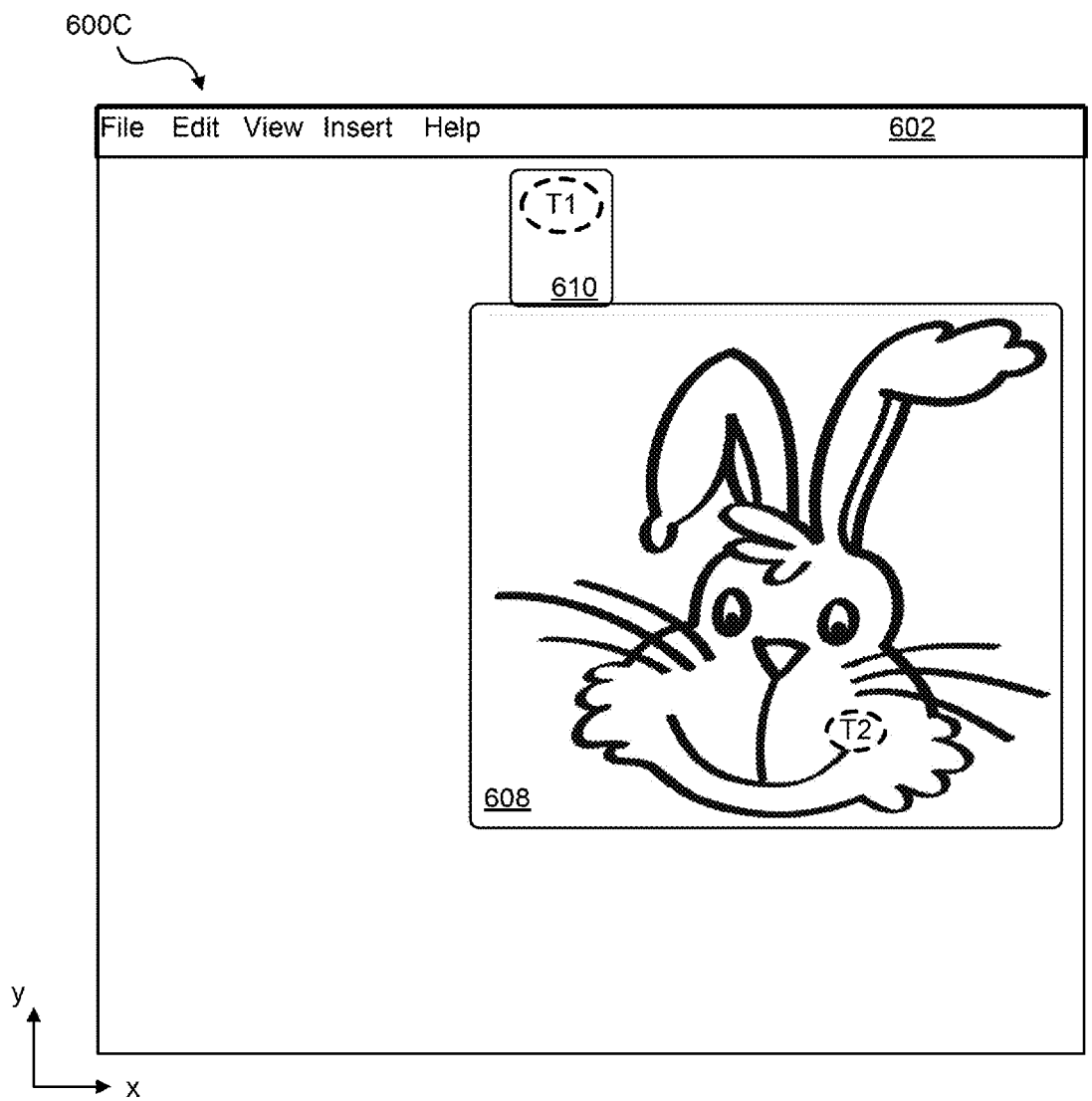

FIGS. 6A-6C are each a diagram showing an illustrative use of multitouch for simultaneous editing and adjustment of application control parameters related to rendering of a document in a graphical user interface. FIG. 6A shows an initial view 600A of a graphical user interface featuring a menu bar 602, design canvas 608, and control area 610. In this example, the control area is shown as a "handle" on design canvas 608 and can be used to set application control parameters related to the position of canvas 608. The particular form of the handle is not meant to be limiting; for instance, rather than a separate handle, a plurality of points of canvas 608 may correspond to control points that allow canvas 608 to be "gripped" and moved. As another example, the control area could comprise a thumbnail of canvas 608 that could be rotated or moved.

In this example, the first touch input uses a single touch T1 which is used to rotate canvas 608 clockwise while a second touch input is made with touch T2. The second touch input comprises a single, static touch in this example and invokes a paint command FIG. 6B shows a view 600B of the graphical user interface while the touch inputs are in progress. Canvas 608 has been partially rotated and, due to the rotation, the document has been edited in response to touch T2 though touch T2 remains fixed. FIG. 6C shows a view 600C of the graphical user interface when the touch inputs are complete—as can be seen, a smile has been added to the character depicted in canvas 608.

For instance, as the first touch input occurs, application control parameters controlling the mapping of touch locations to canvas locations can be updated. Thus, although the x-y coordinates of touch T2 remain the same with respect to the touch area, those same x-y coordinates can correspond to new coordinates in the canvas that result in the line being added in FIGS. 6B-6C. Similar results may occur based on translation of the canvas or magnification of the canvas in addition to or instead of rotation. Additionally, the second touch input may include movement—for example, touch point T2 may be moved while the canvas is rotated in order to achieve different paths for the resulting line. Support for canvas rotation or other positioning while editing is in progress may be particularly advantageous for editing graphical content as the simultaneous touch inputs can more closely approximate the experience of an artist rotating a piece of paper (or other material) while simultaneously painting, drawing, or the like.

This example depicted two-dimensional rotation. Additional embodiments can allow for manipulation of three-dimensional objects. For example, a control area 610 may depict a set of axes, a ball, or other suitable control element(s) to allow for manipulation of a 3D object about an x, y, and z axis. One or more other touch points can be used in the canvas while the various rotations, translations, and the like occur to allow for drawing of lines and other elements in space, tracing patterns on surfaces of 3D objects, etc.

Figure 7:
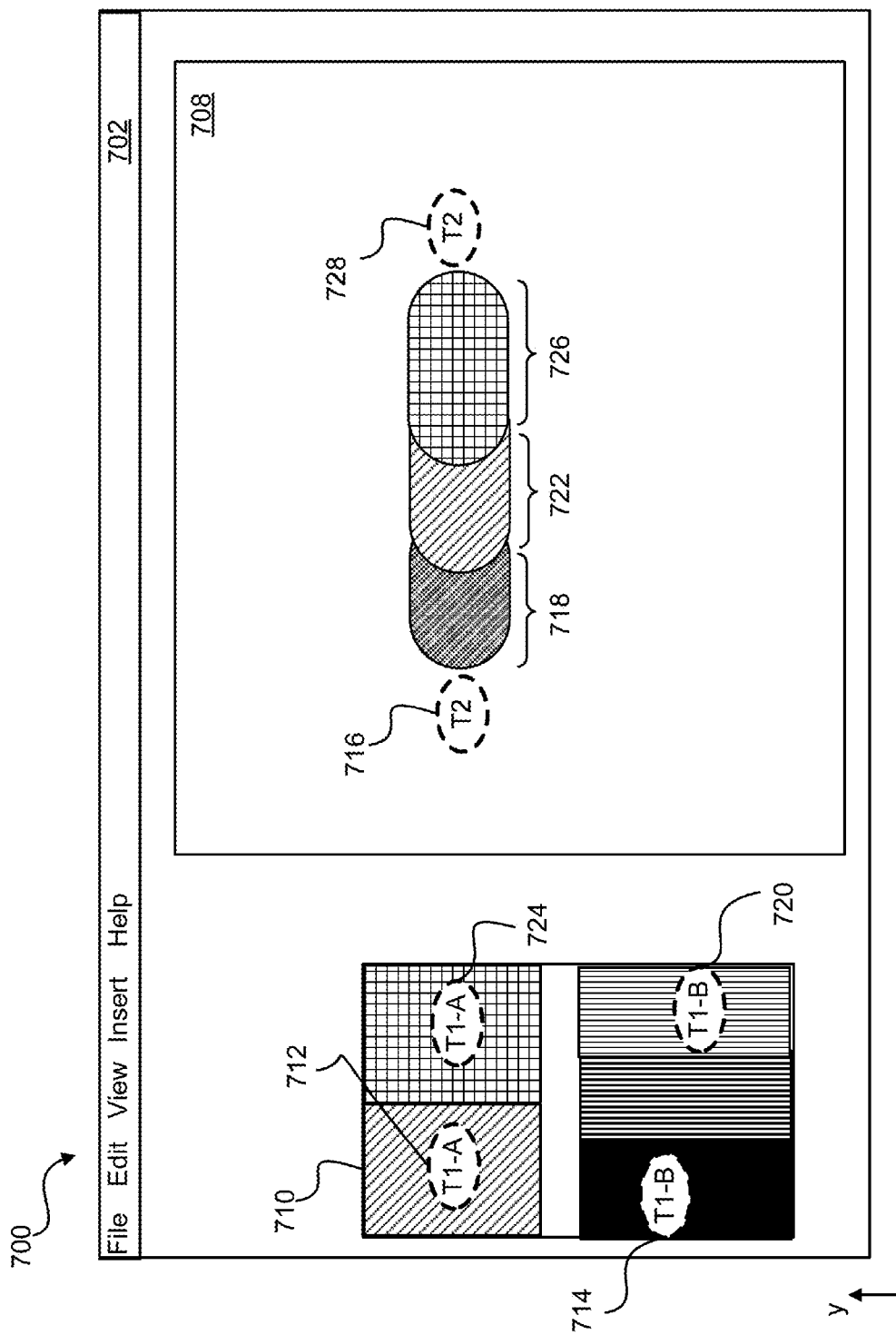
FIG. 7 is a diagram showing an illustrative use of a plurality of simultaneous touch inputs for setting one or more application control parameters while one or more other touches are used for editing input.

FIG. 7 is a diagram showing an illustrative use of a plurality of simultaneous touch inputs for setting one or more application control parameters while one or more other touches are used for editing input. This example depicts a graphical user interface 700 with a menu bar 702, design canvas 708 and control area 710. In this example the first touch input features two touches T1-A and T1-B. Initially, first touch T1-A is at position 712 and touch T1-B is at position 714. For example, position 712 is at a location mapped to a first color, while position 714 is at a position mapped to a first brightness value. As shown in canvas 702, the second touch input uses a single touch T2 that begins at 716 and then moves rightward (x+ in FIG. 7).

Initially, with touches T1-A and T1-B at positions 712 and 714, a first color/brightness is used to paint in the design canvas as shown at 718. Then, as part of the first touch input, touch T1-B can be moved to position 720, which in this example is mapped to a second brightness level. As shown at 722 in the design canvas, the same color is painted, but with the second brightness level. Finally, touch T1-A can be moved to position 724, selecting a different color. As shown at 726, as the second touch input is completed, the second color is painted until touch T2 reaches position 728.

As noted above, when colors and other visual characteristics are selected, the resulting effects may be blended, transitioned, or may otherwise allow for a finer-resolution rendering than provided in these examples.

Figure 8A:
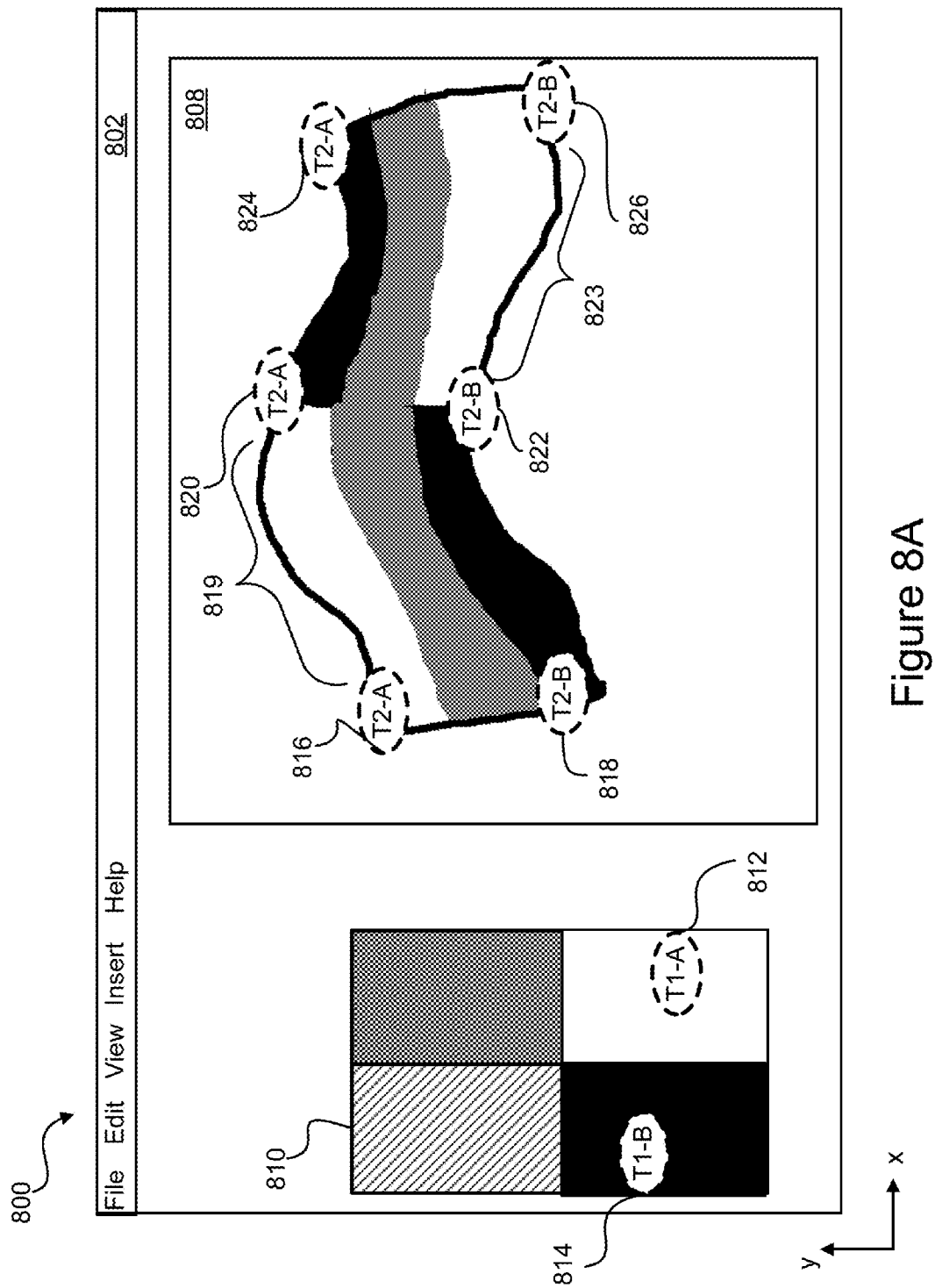
FIG. 8A is a diagram showing an illustrative use of a plurality of simultaneous touch inputs for setting one or more application control parameters while a plurality of other touches are used for editing input.

FIG. 8A is a diagram showing an illustrative use of a plurality of simultaneous touch inputs for setting one or more application control parameters while a plurality of other touches are used for editing input. In this example, graphical user interface 800 features menu bar 802, design canvas 808, and control area 810. Control area 810 features a plurality of color values, two of which can be selected to specify application control values for rendering a gradient. This example shows a first touch input made using a first touch T1-A at position 812 and a second touch T1-B at position 814.

In canvas 808, a second touch input is used to provide an edit command invoking a "ribbon tool" in which a gradient is painted along an arbitrary path specified by the second touch input. In this example, the second touch input begins with touch T2-A at position 816 and touch T2-B at position 818. The user makes a two-object (e.g., two-finger) dragging input with touches T2-A at position 820 and touch T2-B at position 822. As shown at 819, a gradient has been rendered based on the color values specified by the touch input in control area 810. Particularly, this gradient features a black-to-white transition (moving in the y+ direction), represented in the figure using three colors. This example also indicates the results if the user continues the second touch input (or begins another second touch input) moving touches T2-A and T2-B to positions 824 and 826, respectively. As shown at 823, the gradient color values have been adjusted in response to a user switching the positions of touches T1-A and T1-B to positions 814 and 812, respectively.

As noted above, transitions can occur due to updating the application control values at a high rate. For example, rather than the abrupt transition between gradients 819 and 823, the gradient color control parameters can be updated as the positions of touches T1-A and T1-B are swapped. Additionally, the gradient may include a finer transition between color values.

Figure 8B:
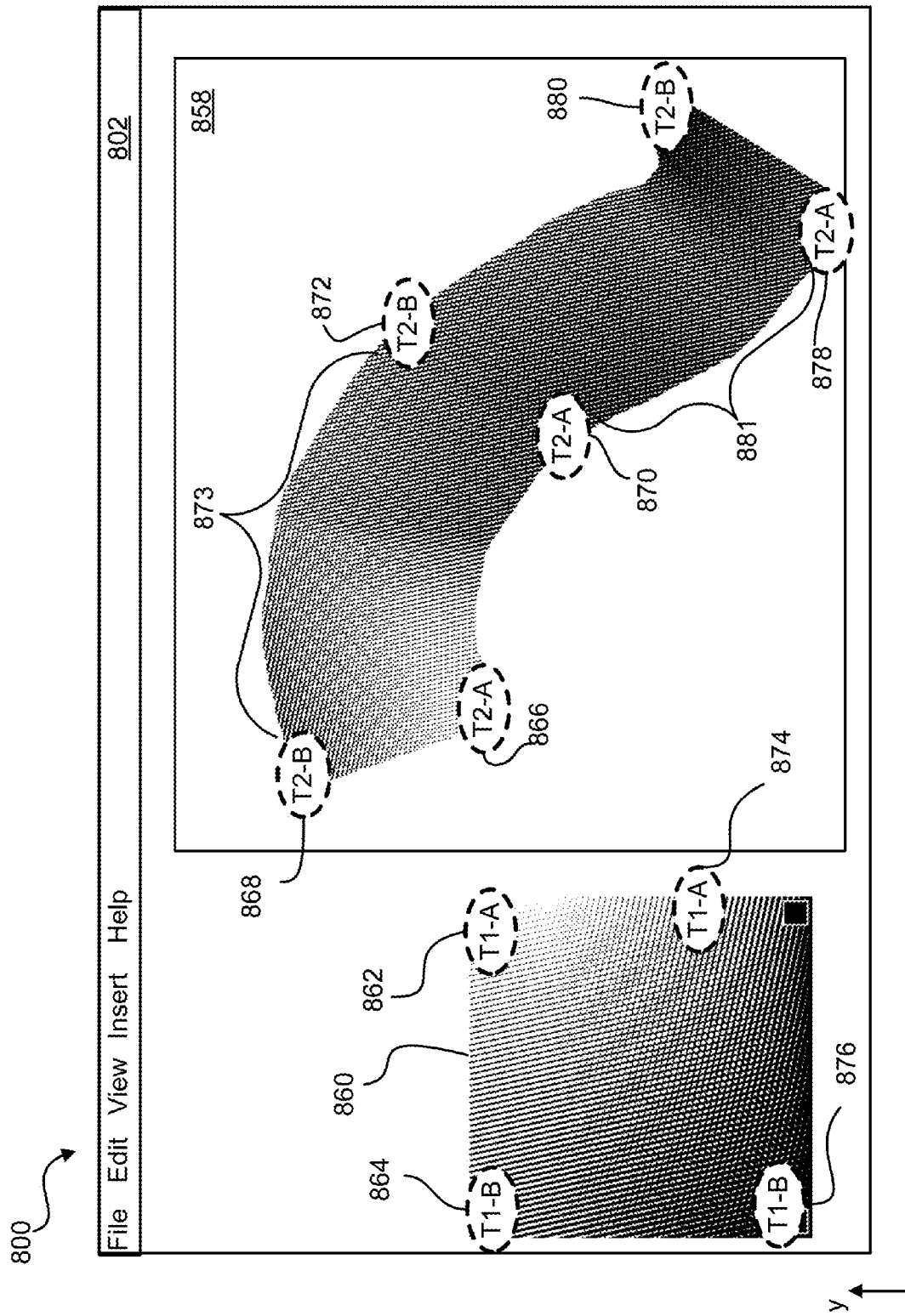
FIG. 8B is a diagram showing an illustrative use of a plurality of simultaneous touch inputs for varying gradient values in a ribbon tool.

FIG. 8B shows another example featuring a design canvas 858 and a control area 860. Here, the first touch input comprises a first touch T1-A and a second touch T1-B defining gradient values to be applied using a ribbon tool. Initially, the first touch input is made with touch T1-A at position 862 and T1-B at position 864. A corresponding second touch input begins with a touch T2-A at position 866 and a touch T2-B at position 868. The second touch input comprises moving touches T2 to positions 870 and 872. As this occurs, a gradient is defined along the path specified by the second touch input. Simultaneously, touches T1 can be moved towards positions 874 and 876. As indicated at 873, this results in a variation in gradient values along the stroke path indicated by the second touch input. The second touch input ends with touches T2 at 878 and 880, and as shown at 881 the resulting gradient continues to transition in response to the first touch input.

Figure 9:
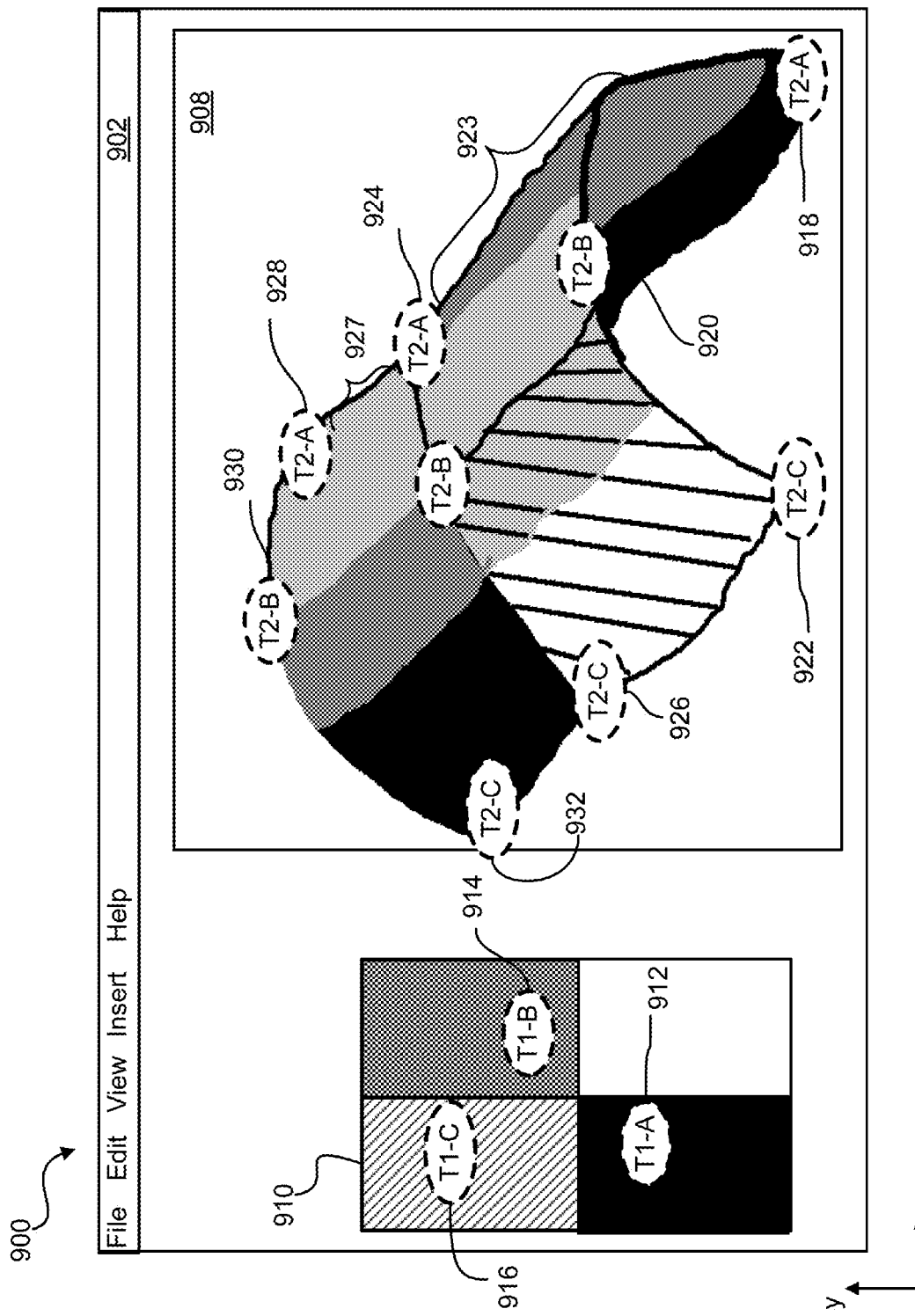
FIG. 9 is a diagram showing another illustrative use of a plurality of simultaneous touch inputs for setting one or more application control parameters while a plurality of other touches are used for editing input.

FIG. 9 is a diagram showing another illustrative use of a plurality of simultaneous touch inputs for setting one or more application control parameters while a plurality of other touches are used for editing input. Particularly, graphical user interface 900 features a design canvas 908 in which an arbitrary shape is painted with gradient values based on control values set in control area 910.

In this example, the first touch input comprises a first touch T1-A, second touch T1-B, and third touch T2-C. Initially, the touches are at positions 912, 914, and 916. The second touch input also comprises three touches (T2-A, T2-B, and T2-C) beginning at points 918, 920, and 922. In this example, the touches T2 serve as points used to define an arc that is dragged upward and leftward (x-minus and y-plus) to define a surface as shown at 923 based on the final touch positions of T2-A, T2-B, and T2-C as shown at 924 and 926 (with T2-B between touches T2-A and T2-C).

A gradient is painted on the surface defined as touches T2 are moved. Particularly, a first gradient is painted on based on the portion of the arc between touches T2-A and T2-B based on the positions of touches T1-A and T1-B in the control area. A second gradient is painted based on the portion of the arc between touches T2-B and T2-C based on the positions of touches T1-B and T1-C in the control area. As shown in design canvas 908, the first gradient transitions from black to light gray (visible in the interior of the arc) while the second gradient transitions from light gray to another color (represented using striped cross-hatching).

This example also shows a change in the positions of touches T1. For example, touch T1-C could be moved to position 912, with the result that in portion 927, the gradient is defined from black to gray from touch T1-C to touch T2-B. The position of touch T2-A is shown, though the gradient on that side of the surface is not visible in this view.

More generally, an editing application can allow an arbitrary number (N) of touches in a design canvas to render a shape with N−1 segments therebetween. Each segment can be correlated to a corresponding segment between N touches in the control area. A gradient can be applied to the segments in the design canvas based on the path of the corresponding segment in the control area. The shape rendered can vary— this example featured an arc between the N touches, though other paths could be used (e.g., straight line, other curves, patterns, etc.).

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, portable music players, and consumer electronic devices such as cameras, camcorders, and mobile devices. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments. In some embodiments, optimal performance is achieved using a mix of pull and push data, with the use of broadcast/multicast as noted above.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A computer-implemented method, comprising:
   defining a graphical user interface configured to receive an edit command via at least one touch input and to edit a document in response to the edit command;
   accessing data from at least one touch sensitive device, the data representing a plurality of simultaneous touches within a touch area of the at least one touch sensitive device;
   in response to a first touch input defined by at least one of the plurality of simultaneous touches, adjusting an application control parameter for the edit command, wherein the application control parameter controls a visual characteristic for content in the document, wherein an editing tool modifies the content in the document using the visual characteristic; and
   in response to at least one second touch input defined by at least one other of the plurality of simultaneous touches, editing the document by performing the edit command using the application control parameter as adjusted in response to the first touch input, wherein performing the edit command comprises using the editing tool with the adjusted visual characteristic to modify the content in the document.

2. The method set forth in claim 1, wherein the application control parameter controls how the document is edited in response to the edit command by modifying a visual characteristic of an edit performed in response to the edit command.

3. The method set forth in claim 2, wherein the visual characteristic comprises at least one of:
   a color,
   a gradient,
   a shape, or
   a tool parameter.

4. The method set forth in claim 3, wherein the first touch input comprises a plurality of simultaneous touches used to define a plurality of values for use in generating a gradient in response to the second touch input.

5. The method of claim 1, wherein the application control parameter comprises a visual characteristic of content to be added to the document and performing the edit command comprises adding the content having the visual characteristic specified by the application control parameter.

6. The method of claim 5, wherein the visual characteristic comprises a dimension of the content.

7. The method of claim 5, wherein the visual characteristic comprises color information of the content.

8. The method of claim 7, wherein the color information comprises at least one of an RGB value, a transparency value, and a brightness value.

9. The method of claim 1, wherein the application control parameter comprises a selection of a shape for the editing tool and performing the edit command comprises editing the document using the editing tool with the selected shape.

10. The method of claim 1, wherein the application control parameter comprises a color selection for the editing tool and performing the edit command comprises editing the document using the editing tool with the selected color.

11. The method of claim 1, wherein the application control parameter comprises a text parameter for the editing tool and performing the edit command comprises adding or modifying text in the document using the editing tool with the selected text parameter.

12. The method of claim 1, wherein the application control parameter comprises a range of colors to be applied in rendering a surface in the document, the surface defined by the respective location of the touches of the plurality of simultaneous touches in a second portion of the touch area.

13. The method of claim 1, wherein the application control parameter comprises a set of values determined based on the location of respective touches of the plurality of simultaneous touches in a first portion of the touch area.

14. The method of claim 13, wherein the set of values define at least one of:
   color ranges of a gradient,
   a color profile, or
   a hue and transparency.

15. A computing system, comprising:
   a processor;
   a memory;
   a display; and
   at least one touch sensitive device interfaced to the processor and defining a touch area,
   wherein the memory embodies one or more program components of an application, the components of the application configuring the computing system to:
      present a graphical user interface using the display, the graphical user interface depicting a document,
      access data provided by the touch sensitive device, the data representing a plurality of simultaneous touches within a touch area of the at least one touch sensitive device;
      in response to a first touch input defined by at least one of the plurality of simultaneous touches, adjust an application control parameter for the edit command, wherein the application control parameter controls a visual characteristic for content in the document, wherein an editing tool modifies the content in the document using the visual characteristic, and
      in response to at least one second touch input defined by at least one other of the plurality of simultaneous touches, edit the document by performing the edit command using the application control parameter as adjusted in response to the first touch input, wherein performing the edit command comprises using the editing tool with the adjusted visual characteristic to modify the content in the document.

16. The system set forth in claim 15, wherein the touch area is defined by a plurality of touch sensitive devices interfaced to the processor.

17. The system set forth in claim 15, the application control parameter controls how the document is edited in response to the edit command by modifying a visual characteristic of an edit performed in response to the edit command.

18. The system set forth in claim 17, wherein the visual characteristic is at least one of:
- a color,
- a gradient, or
- a tool parameter.

19. A non-transitory computer-readable medium tangibly embodying program code executable by a processor, the program code comprising:
- program code for defining a graphical user interface configured to receive an edit command via at least one touch input and to edit a document in response to the edit command;
- program code for accessing data from at least one touch sensitive device, the data representing a plurality of simultaneous touches within a touch area of the at least one touch sensitive device;
- program code for adjusting an application control parameter for the edit command in response to a first touch input defined by at least one of the plurality of simultaneous touches, wherein the application control parameter controls a visual characteristic for content in the document, wherein an editing tool modifies the content in the document using the visual characteristic; and
- program code for editing the document in response to at least one second touch input defined by at least one other of the plurality of simultaneous touches, wherein editing the document comprises performing the edit command using the application control parameter as adjusted in response to the first touch input, wherein performing the edit command comprises using the editing tool with the adjusted visual characteristic to modify the content in the document.

* * * * *